United States Patent Office 3,434,970
Patented Mar. 25, 1969

3,434,970
SELECTIVE FLOCCULANT IN DRILLING MUDS
Frederick Herman Siegele, Westport, Conn., Emil Vincent Ondera, South Salem, N.Y., and Michael Angelo Liberatore, Bridgeport, Conn., assignors to American Cyanamid Company, Stamford, Conn., a corporation of Maine
No Drawing. Filed June 11, 1965, Ser. No. 463,327
Int. Cl. C10m 7/34, 7/26, 7/02
U.S. Cl. 252—8.5                    4 Claims

ABSTRACT OF THE DISCLOSURE

Drilling rate is increased, bit life is increased, and costs decreased, in drilling oil wells, etc., by using a low solids aqueous drilling fluid of comparatively high viscosity, and from which drill cuttings separate rapidly. This fluid has about (1) 3% to 6% of a sodium bentonitic clay, and (2) from 0.01 to 0.08 pound per barrel of a sodium, potassium or ammonium salt of a copolymer of acrylic acid and acrylamide, in the ratio of 80 to 50 mol percent acrylic acid with a molecular weight of at least 200,000 (3) about 0.25 to 1.50 pounds per barrel of a carbonate of sodium, and (4) a pH of 7 to 9.5.

---

This invention relates to a low solids aqueous drilling fluid having a comparatively high viscosity and from which drill cuttings separate comparatively rapidly on standing and which is storage stable, containing sodium bentonitic clay, a polyelectrolyte having the formula:

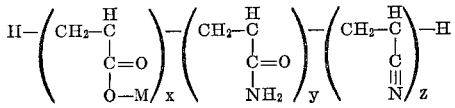

where M is a sodium, potassium or ammonium ion, $x$ is from 80 to 50 mol percent, $y$ is from 20 to 50 mol percent, $z$ is not greater than 1 mol percent, and a carbonate of sodium, the pH of the drilling fluid being between 7 and 9.5.

The drilling of oil wells is a big and important business in many countries. Oil has been found at depths from a few hundred feet to over 20,000 feet. The formations which must be penetrated vary widely as do such variables as temperature, the availability of raw materials, including water, skilled labor and drilling equipment. Whereas hammer drills and reciprocating drills are used in many instances for very shallow wells for water, in general oil well drilling uses almost exclusively a rotary process in which a drill bit is rotated in contact with the bottom of the drill hole to chip away the formation and permit the advancing of the drill bit and deepening of the hole. For many of the very shallow holes and all of the deeper holes some type of a drilling fluid is used. Such fluids include oils, water-in-oil emulsions, oil-in-water emulsions, and predominantly aqueous liquids. For such drilling, the drilling liquid has as one requisite the property of acting as a coolant and lubricant at the cutting edges of the drill bit. For best cutting and lubrication, a comparatively free-flowing low-solids liquid seems preferable. Once the formation has been cut with the drill bit the cuttings must be removed from the hole. The drilling fluid is forced down through one passage and the drill cuttings are carried upward to the surface by the return flow of the drilling fluid. Frequently the drilling fluid flows down through a hollow pipe stem and upwards through the annulus between the hollow pipe stem and the walls of the drill hole. Sometimes a reverse flow is used; and sometimes the drill pipe itself has two passages, one for downward flow and one for upward flow.

Under any conditions the drilling fluid must be viscous enough to suspend the drill cuttings in the fluid at the velocity of flow. The velocity of flow may vary over wide rates as may the size, the specific gravity, and character of the drill cuttings. For deeper wells the temperature may be comparatively high. The drilling fluid must flow readily enough so that a reasonable pressure will circulate the drilling fluid. The drilling fluid must have such characteristics that should the flow of drilling fluid be interrupted for a short or long time the drill cuttings will not pack around the drill-bit firmly enough to lock the pipe in position. This may be accomplished by either having the drilling fluid viscous enough at very low rates of shear so that the drill cuttings do not settle, or by having the drill cuttings so affected by additives that even if settled, the cuttings retain fluidized characteristics. Similarly, the drilling fluid must flow readily enough so that if the flow of the drilling fluid and rotation of the drill pipe are interrupted, both can be again started.

It thus appears that a thixotropic drilling fluid is desirable. A Newtonian fluid is one whose viscosity remains constant so that over a particular range in question (for laminar flow) the rate of shear is proportional to the driving force causing the shear. At very high rates of shear, turbulence modifies power requirements for the flow of Newtonian fluids. A thixotropic fluid is one in which the viscosity, that is the ratio of shear rate to driving force causing the shear, increases as the rate of shear decreases. A gelatin dessert has such characteristics in that the gelatin sets and has the quivery characteristic of a solid having a very low Young's modulus, and yet on stirring becomes a liquid.

Additionally, in drilling fluids the hydrostatic pressure of the drilling fluid in the well is important. For deeper holes the specific gravity must be higher than water for the two purposes of (a) keeping the formation pressure from collapsing the drilling hole and (b) preventing fluids under pressure from forcing the drilling fluid out of the hole. Additionally, the drilling fluid in many instances must be a mud having such characteristics as to seal the walls of the drill hole to prevent the flow of the drilling fluid or an aqueous fraction thereof into the formation. Further, the desire to minimize drilling costs dictates that the lowest price drilling fluid be used which achieves other desired objectives to an acceptable extent.

It can be seen that many of these objectives are at least in part contradictory and conflicting, requiring that a compromise be adopted between the various desired characteristics. As the drilled depths and formations encountered vary widely, no one drilling fluid can be considered as best for all conditions. Consequently, many different drilling fluids are in common use and many patents have issued on drilling fluids. Some of the teachings of these patents are contradictory on their face because for particular wells one characteristic must predominate at the expense of others. Hence, even to those skilled in the art teachings of one patent cannot be extrapolated to a different set of conditions and the fluid requirements for one set of well conditions are not necessarily readily predictable from a knowledge of fluids having related components adapted for different conditions.

It is common in the industry to give clay usage in percent by weight, other additives in pounds per barrel, which for water is pounds in that volume which corresponds to 350 pounds of pure water (42 gallons), and the usage of weighting compounds is expressed as (a) pounds per barrel of the clay-containing mud, or (b) the amount needed for a final density in pounds per unit volume. For low rates of addition, the pounds per barrel is about 3.5 times the percentage by weight. For higher usage rates, a correction for apparent density may be required.

For usage rates within the scope of this invention the correction factor is too small to be important. For some reference patents, the correction may be large.

A representative but not necessarily exhaustive group of such patents includes:

U.S. Patent 2,552,775, P. W. Fisher & J. F. Cook, "Drilling Fluid," May 15, 1951, describes a drilling fluid having polyacrylic acid of a molecular weight from 5,000 to 50,000 as an alkali metal salt such as the potassium or sodium salt containing sodium carbonate or sodium chloride and bentonite. Example 5 discloses a fluid having 5% bentonitic clay, 7% sodium carbonate and 1% potassium polyacrylate, (about 3.5 pounds per barrel), all by weight, which is then weighted with barytes to 80 pounds per cubic foot.

U.S. Patent 2,718,497, W. N. Oldham & E. L. Kropa, "Drilling Muds," Sept. 20, 1955, discloses 0.2 to 8 pounds per barrel (about 0.057% to about 2.3% by weight) of a polyacrylamide or polyacrylonitrile hydrolyte having a molecular weight from about 10,000 to 2,000,000 and discloses that with a polyacrylamide the hydrolysis may be at least partially accomplished by sodium carbonate in the well at the temperatures attained in use in the well. A high solids mud is described having a specific gravity of about 1.3.

U.S. Patent 2,755,557, R. L. Morgan, "Drilling Muds Containing Acrylic Acid-Acrylamide Copolymer Salts," Dec. 25, 1956, discloses acrylic acid-acrylamide polymers having a molecular weight of 10,000 to as high as 611,000 with the ratio of carboxylic acid groups to amide groups between 10:90 and 65:35 with bentonitic clays in drilling muds. The polymer is recommended at a usage of from 0.1 to 8 pounds per barrel (about 0.028 to about 2.3% by weight). A typical mud contains 40 pounds per barrel of a calcium-bentonite clay. With these polymers, as additional polymer was added viscosity increased and then in many instances at higher concentrations, the viscosity dropped down.

U.S. Patent 2,981,630, B. W. Rowland, "Clay Products and Fractionation Treatment of Heterogeneous Aggregates Such as Clay," Apr. 25, 1961, discloses certain polymers for the sedimentation fractionation of clays into dilatant and thixotropic fractions.

U.S. Patent 3,040,820, J. P. Gallus, "Method for Drilling With Clear Water," June 26, 1962, discloses the use of acrylamide polymer, about 0.8% to 10% hydrolyzed, at levels of 0.001 to 0.02 pound per barrel as it enters the well with clear water as a drilling fluid. The polymer is used as a non-selective flocculant in a drilling fluid in which clays are absent. Polymer is also added to the drilling fluid as the fluid enters the mud pit.

U.S. Patent 3,040,821, M. B. Widess, "Drilling Wells With Clear Water," June 26, 1962, discloses the use of an acrylamide polymer hydrolyte, about 0.8% to 10% hydrolyzed, which polymer is used in slugs to remove cuttings in slugs. The water circulated has less than 0.5% solids.

U.S. Patent 3,070,543, P. P. Scott, Jr., "Low Solids Drilling Fluid," Dec. 25, 1962, discloses a low solids drilling fluid containing from 0.01 to about 0.5 pound per barrel of a water-soluble vinyl-maleic copolymer which is polymerized to a viscosity of between 1 and 3 centipoises for an 0.4% solution in water at 25° C., which drilling fluid contains from 2% to 7% by weight of montmorillonitic clay. The use of 0.5 to 1.5 pounds per barrel of sodium carbonate is disclosed. The sodium carbonate enhances the action of the polymer. (At least some of the polymers disclosed have a molecular weight of about 250,000 to 500,000.)

U.S. Patent 3,072,569, F. H. Siebele, "Drilling Fluid Compositions," Jan. 8, 1963, discloses a drilling fluid comprising a high calcium content clay and as a fluid loss control agent a hydrocarbon chain polymer containing hydroxyl and carboxylic groups in the ratio of 70:90 to 30:10. The use of vinyl alcohol-sodium acrylate copolymers are exemplified, particularly for high calcium, high solids, high temperature drilling.

U.S. Patent 3,081,260, A. Park, "Low Solids Drilling Fluid," Mar. 12, 1963, discloses a mixture of montmorillonitic clay and polyacrylamide hydrolytes, about 0.8% to 10% hydrolyzed. The use of sodium carbonate is disclosed.

U.S. Patent 3,157,599, W. E. Gloor, "Drilling Fluid," Nov. 17, 1964, discloses a divinyl ether-maleic anhydride copolymer as a water loss preventative with various muds.

Canadian Patent 535,786, J. J. Padbury & G. S. Sprague, "Drilling Muds and Method of Drilling Therewith," Jan. 15, 1957, discloses a vinyl ester-maleic anhydride copolymer having a molecular weight of 5,000 to 1,000,000 and 50 to 80 mol percent vinyl ester having a calcium-sequestering action with bentonitic clays at from 0.2 to 8 pounds of the polymer per barrel. The clay, such as bentonitic clay, is exemplified at levels of around 20 pounds per barrel.

Canadian Patent 539,813, R. L. Morgan, "Non-Hygroscopic Hydrolyzed Polyacrylonitrile Salts," Apr. 23, 1957, discloses a dry mixture of a hydrolyzed acrylonitrile polymer having a molecular weight of from 75,000 to 300,000 on bentonite as a carrier.

Canadian Patent 615,987, R. B. Booth, "Fluidizing Aqueous Suspensions of Solids," Mar. 7, 1961, discloses water-soluble polyelectrolytes as fluidizing agents to keep comparatively large particles from settling out in a non-resuspendable form. This is particularly useful in agitators or leaching operations or other operations where the pulp may stall an agitator if agitation is interrupted. Polyacrylamides having molecular weights from 100,000 to well over 3,000,000 including acrylic acid-acrylamide copolymers are disclosed.

Canadian Patent 642,565, R. L. Morgan, "Hydrolyzed Chlorate-Polymerized Polyacrylonitriles In Drilling Muds," June 12, 1962, discloses an aqueous clay suspension containing at least 2 pounds per barrel of a hydrolyzed polyacrylonitrile as the drilling fluid.

Canadian Patent 700,862, F. M. Aimone, "Polyelectrolytes In Drilling Operations," Dec. 29, 1964, discloses from 0.1% by weight of the aqueous system down to 0.005 pound of polyelectrolyte per ton of suspended cuttings of a synthetic polyelectrolyte in drilling with water, of molecular weight of at least 5,000 to 20,000,000. A general not selective flocculation is achieved.

Although the field is extremely active, the inconsistent objectives to be obtained render predictability impossible for specific purposes. For example, high viscosity fluids are required to maintain chip-carrying capabilities. If achieved by clay addition the high solids is inconsistent with the desire to have a minimum clay content to permit a rapid drilling rate, and a low clay content may permit an unduly high fluid loss to a formation. If achieved by polymers alone, the cost may be too high, and fluocculation non-selective. High molecular weight polymers are viscous at low concentrations, but not specific in their action.

For economical use it is necessary that the drilling fluid be recirculated. To be recirculated it is necessary that the larger chips at least be settled out and there is a need for selective flocculation in which the viscosity-increasing clays, such as the bentonites, are kept in suspension and the drill-solids, which may include calcium and magnesium clays together with various silicates and other materials, are caused to settle out in the mud pits. Sodium-bentonitic clays are most useful in increasing viscosity, but other solid minerals normally encountered including particularly drill cuttings, tend to build up the solids content but not increase the viscosity. At least part of the drill solids obtained when drilling hard formations are finely ground thus giving at least some drill cuttings which are of a size comparable with the bentonitic clays. This presents the problem of selectively settling out the drilled solids by means based on chemical characteristics and not size.

We have now found that remarkably good results are obtained using an aqueous drilling fluid having from about 3% to about 6% by weight of a sodium-bentonitic clay suspended in the drilling fluid and from 0.025 to 0.08 pound per barrel (about 0.008% to about 0.028% by weight) of a polyelectrolyte having the formula:

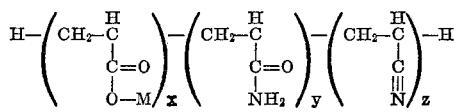

where M is sodium, potassium or ammonium ion, $x$ is from 80 to 50 mol percent, $y$ is from 20 to 50 mol percent, $z$ is not greater than 1 mol percent, with a molecular weight of at least 200,000 and the viscosity of which at a concentration of 0.5% in one normal sodium chloride at 30° C. is at least 2.1 centipoises and which drilling fluid additionally contains about 0.25 to 1.50 pounds per barrel of a carbonate of sodium (0.072 to 0.43% by weight) at a pH of between 7 and 9.5, and preferably between 7.5 and 9. Sodium bicarbonate is preferred. Sodium carbonate alone gives an undesirably high pH. By virtue of the preferred pH of 7.5 to 9, there is obtained an improved flocculation of drill solids and a higher viscosity, in combination with the polymer and bentonite retained in suspension.

Sodium carbonate can be added, and then acidified to the preferred pH of about 7.5 to 9, and in effect the sodium carbonate can be converted to sodium bicarbonate in situ. Generally, it is more convenient to add sodium bicarbonate than to form in situ.

The criterion for the drilling fluid includes:

(a) Under well temperature and salinity conditions, the flocculant flocculates and separates in the mud pits calcium-bentonites, and other drill cuttings both large and small, even in particle sizes the same as the sodium-bentonitic clays.

(b) The flocculant at the same time does not cause separation of major portions of sodium-bentonite clays, although small amounts may be entrained and lost.

(c) About 3% to about 6% of sodium-bentonitic clay is suspended in the drilling fluid and hydrates, causing an increase in viscosity, the polymer added as flocculant further increases the viscosity of the clay suspension at a pH of about 7 to 9.5, and preferably at 7.5 to 9, with carbonates of sodium being present.

The flocculant of the formula above defined has such characteristics, and the efficacy can be further checked, and the polymer identified by measuring the viscosity at a concentration of 0.5% in 1 normal (1 N) sodium chloride at 30° C.

The polymer may be produced by known commercial methods, some of which are illustrated in the above cited art. Obviously, if commercially available monomers are used as starting materials the product polymer may have traces of vinyl impurities copolymerized into the chain, which may cause some chain branching. Similarly, on theoretical grounds, a vinyl group should remain at one end of the chain, but polymerization catalysts or traces of chain-terminating impurities are believed to be present to terminate polymerization. As the molecular weight range of this invention is 200,000 and up, the presence of such impurities or chain-terminating groups is not readily detected by state-of-the-art analytical techniques, and must be primarily hypothesized on theoretical grounds. Such minimal components of the polymer, if present are not represented in the above representative formula.

The polymer may be produced by hydrolysis of polyacrylonitrile, which may leave traces of nitrile substituents remaining on the chain, less than about 1%. These have no appreciable effect, but their presence is shown in the formula. The polymer may be produced by hydrolysis of polyacrylamide. The polymer may be produced by copolymerization of acrylic acid and acrylamide. Even if the carboxylic hydrogen is not neutralized in the polymer as added, at the pH of use, 7 to 9.5, the polymer in effect is neutralized and hence is presented as the sodium, potassium or ammonium compound.

Polymers of up to 5,000,000 molecular weight give useful results. Polymers of higher molecular weight of the present compositions are not economically produced by current polymer techniques. A range of 200,000 to about 2,000,000 is a preferred compromise between effectiveness of the polymer and cost of production.

Under these conditions viscosity is an indication of both molecular weight, molecular shape, and correlates with viscosity-increasing characteristics under drilling fluid uses. These are readily simulated and measured by a simple laboratory test.

The present invention may be more clearly understood from the following examples:

EXAMPLE 1

10.5 g. of Wyoming bentonite were dry-blended with 0.05 g. of copolymer (however, copolymer may be added prior to or after clay). The copolymer was a copolymer of acrylic acid and acrylamide containing 60 mol percent carboxylic groups as the sodium salt and 40 mol percent amide groups and having a molecular weight of 400,000. Effectively the same polymer may be produced by hydrolysis of polyacrylonitrile, polyacrylamide or copolymerization of a mixture of monomers. The mixture was then added to 350 cc. of de-ionized water and stirred on a Hamilton Beach Multi-mixer for 15 minutes. Relevant rheological properties were determined, prior to and after addition of 1.0 g. of sodium bicarbonate (1.0 pounds per barrel). Another sample was prepared using sodium carbonate in place of sodium bicarbonate and the rheological properties of this sample were also measured. The results of these experiments are given in Table I. Sodium carbonate is not as effective in increasing the apparent viscosity as sodium bicarbonate. This table shows two polymer levels, and a comparison between two carbonates of sodium, and a blank with none.

The synergistic interaction between the sodium-bentonitic clay, the polymer as defined, and sodium bicarbonate are striking. Sodium carbonate gives some improvement, but alone is too alkaline for optimum results.

TABLE I.—DRILLING FLUID CHARACTERISTICS

| | No Polymer | | | 0.025 lb./bbl. polymer | | | 0.05 lb./bbl. polymer | | |
|---|---|---|---|---|---|---|---|---|---|
| | No Carbonate | 1 lb./bbl. NaHCO$_3$ | 1 lb./bbl. Na$_2$CO$_3$ | No Carbonate | 1 lb./bbl. NaHCO$_3$ | 1 lb./bbl. Na$_2$CO$_3$ | No Carbonate | 1 lb./bbl. NaHCO$_3$ | 1 lb./bbl. Na$_2$CO$_3$ |
| Apparent viscosity (cps.) | 3 | 3.5 | 3.5 | 3.25 | 15 | -------------- | 3.75 | 15 | 6 |
| Plastic viscosity (cps.) | 3 | 2.5 | 2.5 | 2.5 | 6 | -------------- | 3.5 | 6 | 4 |
| Yield value (lb./100 ft.$^2$) | 0 | 2 | 2 | 1.5 | 18.5 | -------------- | 0.5 | 18 | 4 |
| Fluid loss (cc./30') | 6 | 23 | 24 | -------------- | 25.6 | -------------- | -------------- | 23 | 19 |
| pH | 9.0 | 8.3 | 10.6 | 8.8 | 8.2 | -------------- | 8.1 | 8.3 | 10.2 |

A test run was made using a vinyl acetate-maleic anhydride copolymer of the prior art in the manner recommended in U.S. Patent 3,070,543 and comparing it with an acrylamide-acrylic acid copolymer of this invention. The polymer of this invention contained 60% carboxyl groups and 40% amide groups and had an intrinsic viscosity of 2.3 in sodium chloride solution at 30° C. and a molecular weight of about 400,000. The same rheological properties were measured, the samples were left standing overnight at room temperature, stirred the following day and the properties were again measured. The results are shown in Table II.

TABLE II

| | 0.025 lb./bbl. copolymer of 60% acrylic acid and 40% acrylamide | | 0.05 lb./bbl. vinyl-maleic copolymer | |
|---|---|---|---|---|
| | Initial | After 24 hours standing | Initial | After 24 hours standing |
| Apparent viscosity (cps.) | 15 | 11 | 10.5 | 5 |
| Plastic viscosity (cps.) | 6 | 4.5 | 6 | 4 |
| Yield value (lb/100 ft.$^2$) | 18.5 | 13.5 | 9 | 1.5 |

The continuing effectiveness of the polymers of this invention is an important advantage over the prior art material.

Low clay levels are preferred for best drilling rates.

The importance of removing drill-cuttings has been noted. The effective removal of these products is shown by test. A 100 ml. graduated cylinder is filled to a given mark (ca. 110 ml.) with a 3% aqueous suspension of Grundite, an illite clay from Grundy County, Illinois. To this, the polymer to be tested is added as an aqueous solution in amounts corresponding to 0.025 to 0.05 lb./bbl. Sodium bicarbonate may be added at this point. The contents of the graduated cylinder are stirred in a reproducible manner, by turning the cylinder end over end 10 times. The time that the "front" (demarcation between clear supernatant and flocculated grundite), takes to pass from the 100 ml. line to the 50 ml. line is recorded as the flocculation time. The results (in seconds) are reported in Table IV.

TABLE IV.—FLOCCULATION TIME OF GRUNDITE (IN SECONDS)

| Additive level | | No carbonate | 0.5 lb./bbl. NaHCO$_3$ | 1.0 lb./bbl. NaHCO$_3$ | 0.5 lb./bbl. Na$_2$CO$_3$ | 1.0 lb./bbl. Na$_2$CO$_3$ |
|---|---|---|---|---|---|---|
| | | 560 | | 1,000 | | 500 |
| 0.025 lb./bbl. | Acrylamide-acrylic acid copolymer | 15 | 15 | 10 | 15 | 14 |
| 0.05 lb./bbl. | do | 11 | 12 | 13 | 14 | 15 |
| 0.025 lb./bbl. | Vinyl-maleic copolymer | 44 | 41 | 41 | 41 | 39 |
| 0.05 lb./bbl. | do | 46 | 47 | 46 | 40 | 38 |

In drilling a 6,240 foot well in west Texas, the low solids permits a fast drilling rate. The return mud is led to mud pits in conventional fashion, and the drill cuttings rapidly settle leaving suspended sodium-bentonite mud ready for subsequent reuse.

Copolymer levels appreciably above 0.05 lb./bbl. are effective. Preferred results are obtained in the range of 0.025 to 0.05 pound per barrel. Higher levels can improve fluid loss control, if a particular formation requires such control. Systems in which clay levels are above 5% may benefit from higher treatment as an extrapolation of the data in Table III indicates.

TABLE III.—VARYING CLAY LEVELS

| Polymer level | | Clay level | | |
|---|---|---|---|---|
| | | 3% | 4% | 5% |
| 0.025 lb./bbl. plus 1.0 lb./bbl. NaHCO$_3$. | Apparent viscosity, cps | 15 | 22.5 | 37 |
| | Plastic viscosity, cps | 6 | 6 | 8 |
| | Yield value, lbs/100 sq. ft | 18.5 | 35 | 56 |
| | Fluid loss, cc | 25.6 | 23 | 19.6 |
| 0.05 lb./bbl. plus 1.0 lb./bbl. NaHCO$_3$. | Apparent viscosity, cps | 15 | 29 | 44.5 |
| | Plastic viscosity, cps | 6 | 6 | 6 |
| | Yield value | 18 | 44 | 77 |
| | Fluid loss, cc | 25.8 | 20 | 17 |
| 0.1 lb./bbl. plus 1.0 lb./bbl. NaHCO$_3$. | Apparent viscosity, cps | 8 | 21 | 46 |
| | Plastic viscosity, cps | 5 | 8 | 9.5 |
| | Yield value, lbs./100 sq. ft | 7.5 | 26 | 72 |
| | Fluid loss, cc | 19.6 | 16.4 | 14.4 |
| No polymer plus 1.0 lb./bbl. NaHCO$_3$. | Apparent viscosity, cps | 3.5 | 5.5 | 7.5 |
| | Plastic viscosity, cps | 2.5 | 4.0 | 4.5 |
| | Yield value, lbs./100 sq. ft | 2.0 | 3.0 | 6.5 |
| | Fluid loss, cc | 26.4 | 21 | 18 |

Other buffers may be used in place of NaHCO$_3$ to increase the clay yield for systems at higher or lower pH values. For example, if 1.0 lb./bbl. of sodium acetate were added in place of sodium bicarbonate, the yield would increase appreciably. Moreover, the sample could be acidified with HCl or acetic acid from pH 8.7 to pH 6.0 and reach a still higher yield value. Results of this experiment are reported in Table V.

TABLE V.—SODIUM ACETATE SYSTEM

| | 1 lb./bbl. sodium acetate | Acidified with HCl |
|---|---|---|
| Apparent viscosity, cps | 12 | 15 |
| Plastic viscosity, cps | 5.5 | 4 |
| Yield point, lb./100 ft.$^2$ | 13 | 22 |
| pH | 8.7 | 6.0 |

Effect of variation of pH from a mixture of carbonates of sodium on the rheological properties of a low solids drilling fluid using the test procedures described in Example 1, i.e., 10.5 lb./bbl. (3%) bentonite, 0.05 lb./bbl. polymer of Example 1 and a total of 1 lb./bbl. of carbonate and/or bicarbonate, is shown in Table VI.

TABLE VI.—EFFECT OF MIXTURES OF CARBONATE SALTS OF SODIUM ON LOW-SOLIDS MUDS

| Test No. | NaHCO$_3$/Na$_2$CO$_3$(q.) | Final pH | Apparent visc. (cps) | Plastic visc. (cps) | Yield value (lb./100 ft.$^2$) |
|---|---|---|---|---|---|
| 1 | 0/1.0 | 10.6 | 4.5 | 3 | 3 |
| 2 | 0.25/0.75 | 10.1 | 6.0 | 3.5 | 5 |
| 3 | 0.5/0.5 | 9.8 | 6.7 | 4.0 | 5.5 |
| 4 | 0.75/0.25 | 9.3 | 8.0 | 4.0 | 8 |
| 5 | 1.0/0 | 8.5 | 10.5 | 5 | 11 |
| 6 | 1.0/0 plus acid (HCl) | 7.0 | 15 | 5 | 20 |

The variation in performance obtained from two polymers whose molecular weights lie within the effective range disclosed by this invention, is illustrated in Table VII. Both copolymers contain 70 mol percent carboxylic groups as the sodium salt and 30 mol percent amide groups. Polymer A has a molecular weight of 420,000. Polymer B has a molecular weight of 750,000. The mud was prepared and the rheological properties were measured as disclosed in Example 1. The flocculation time was obtained by the test described for Table IV.

As the molecular weight of the polymer is increased above 400,000 additional improvement in performance is obtained.

TABLE VII.—EFFECT OF INCREASING MOLECULAR WEIGHT ON THE POLYMERS PERFORMANCE IN THE LOW SOLIDS MUD SYSTEM

| Polymer | Molecular weight | Polymer conc., lbs./bbl. | NaHCO₃ conc., lbs./bbl. | Apparent visc. (cps.) | Plastic visc. (cps.) | Yield value (lb./100 ft.²) | Floc. time (sec.) |
|---|---|---|---|---|---|---|---|
| A | 420,000 | 0.05 | 1.0 | 14 | 6 | 16 | 15 |
| B | 750,000 | 0.05 | 1.0 | 18 | 7 | 22 | 11 |

The effect of polymers of the type disclosed by U.S. Patent 3,081,260 (A. Park), is illustrated below. While higher molecular weight polymers of this type are good flocculants, much better thickening and results are obtained by the polymers of this invention. It is unexpected that by changing comonomer ratios such remarkable results are obtained.

TABLE VIII

| Polymer type | Molecular weight | NaHCO₃ conc. (lb./bbl.) | Polymer conc. (lbs./bbl.) | Apparent visc. (cps.) | Plastic visc. (cps.) | Yield value (lb./100 ft.²) | Flocculation time (sec.) |
|---|---|---|---|---|---|---|---|
| 10 mol percent carboxylic, 90 mol percent amide (Park) | 200,000 | 1.0 | 0.05 | 3.5 | 3 | 1 | 45 |
| 3 mol percent carboxylic, 97 mol percent amide (Park) | 5,000,000 | 1.0 | 0.05 | 5.0 | 3.5 | 3.0 | 2 |
| Polymer of this invention: 70 mol percent carboxylic, 30 mol percent amide | 750,000 | 1.0 | 0.05 | 18 | 7 | 22 | 11 |

The polymer of Park at a molecular weight of 5,000,000 gives excellent flocculation, but not the high apparent viscosity desired and achieved by the present invention.

Drilling of actual oil wells in representative areas where a low solids mud is a preferred drilling fluid show that the superior results predictable from the above test results are achieved in actual operation. Because each well has uncontrollable variables such as the skill of the crew, sharpness of bits, local anomalies in formations, etc., individual well results can be misleading. But, on average, and in general, superior results are obtained.

We claim:

1. A low solids aqueous drilling fluid having a comparatively high viscosity, and from which drill cuttings separate rapidly on standing and which maintains such characteristics for at least 24 hours comprising:
   (a) about 0.25 to about 1.50 pounds per barrel of a carbonate of sodium,
   (b) from about 3% to about 6% by weight of a sodium-bentonitic clay,
   (c) from about 0.01 to about 0.08 pound per barrel of a polyelectrolyte having the representative formula:

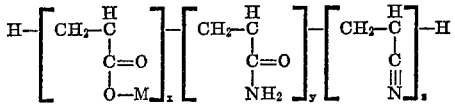

where M is a sodium, potassium or ammonium ion, $x$ is from 80 to 50 mol percent, $y$ is from 20 to 50 mol percent, $z$ is not greater than 1 mol percent, and the total is 100 mol percent, in which the groups within the parenthesis may be in random order and orientation, the weight average molecular weight is at least 200,000, and the viscosity at a concentration of 0.5% in 1 N sodium chloride at 30° C. is at least 2.1 centipoises, and
   (d) the pH of the drilling fluid being between 7 and 9.5.

2. The fluid of claim 1 in which the pH is between 7.5 and 9, and the polyelectrolyte (c) is within the range of about 0.025 and about 0.05 pound per barrel.

3. In the process of drilling an oil well with a rotary drill the improvement which comprises:
   pumping into the drill hole through one passage and returning from the cutting face through another passage a low solids aqueous drilling fluid having a comparatively high viscosity, and from which drill cuttings separate rapidly on standing and which maintains such characteristics for at least 24 hours comprising:
   (a) about 0.25 to about 1.50 pounds per barrel of a carbonate of sodium,
   (b) from about 3% to about 6% by weight of a sodium bentonitic clay,
   (c) from about 0.01 to about 0.08 pound per barrel of a polyelectrolyte having the representative formula:

$$H-\left(\begin{array}{c}CH_2-C-H \\ | \\ C=O \\ | \\ O-M\end{array}\right)_x \left(\begin{array}{c}CH_2-C-H \\ | \\ C=O \\ | \\ NH_2\end{array}\right)_y \left(\begin{array}{c}CH_2-C-H \\ | \\ C \\ ||| \\ N\end{array}\right)_z -H$$

where M is a sodium, potassium or ammonium ion, $x$ is from 80 to 50 mol present, $y$ is from 20 to 50 mol percent, $z$ is not greater than 1 mol percent, and the total is 100 mol percent, in which the groups within the parenthesis may be in random order and orientation, the weight average molecular weight is at least 200,000, and the viscosity at a concentration of 0.5% in 1 N sodium chloride at 30° C. is at least 2.1 centipoises, and
   (d) the pH of the drilling fluid being between 7 and 9.5;
passing the drilling fluid containing cuttings as it flows from the well to a settling tank,
flocculating, settling and thereby separating drill cuttings,
retaining in the fluid in this settling process the sodium-bentonitic clay, and
recycling the drilling fluid containing sodium-bentonitic clay thus freed from drill cuttings again into the well.

4. The process of claim 3 in which the pH is between 7.5 and 9 and the polyelectrolyte (c) is within the range of about 0.025 and about 0.05 pound per barrel.

References Cited

UNITED STATES PATENTS 2,775,557  12/1956  Morgan _____ 252—8.5
3,025,236  3/1962  Barrett et al. _____ 252—8.5
3,070,543  12/1962  Scott _____ 252—8.5
3,081,260  3/1963  Park _____ 252—8.5

FOREIGN PATENTS 700,862  12/1964  Canada.

HERBERT B. GUYNN, *Primary Examiner.*

UNITED STATES PATENT OFFICE
CERTIFICATE OF CORRECTION

Patent No. 3,434,970                  March 25, 1969

Frederick Herman Siegele et al.

It is certified that error appears in the above identified patent and that said Letters Patent are hereby corrected as shown below:

Column 3, line 70, "Siebele" should read -- Siegele --. Columns 5 and 6, TABLE I, second column, line 4 thereof, "6" should read -- 26 --. Columns 7 and 8, TABLE VI, in the heading to the fourth column, line 3 thereof, "(c.ps)" should read -- (cps.) --.

Signed and sealed this 9th day of June 1970.

(SEAL)
Attest:

Edward M. Fletcher, Jr.
Attesting Officer

WILLIAM E. SCHUYLER, JI
Commissioner of Patent